US012022252B2

(12) United States Patent
Choe et al.

(10) Patent No.: US 12,022,252 B2
(45) Date of Patent: Jun. 25, 2024

(54) SOUND INPUT-OUTPUT CONTROL APPARATUS, SOUND INPUT-OUTPUT CONTROL METHOD, AND NON-TRANSITORY COMPUTER-READABLE MEDIUM

(71) Applicant: JVCKENWOOD Corporation, Yokohama (JP)

(72) Inventors: Jeongju Choe, Yokohama (JP); Hiroyuki Kumakura, Yokohama (JP); Katsumi Tomizawa, Yokohama (JP); Ryo Miyakuchi, Yokohama (JP); Hideki Takehara, Yokohama (JP); Naribumi Omata, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 138 days.

(21) Appl. No.: 17/856,647

(22) Filed: Jul. 1, 2022

(65) Prior Publication Data

US 2022/0337934 A1 Oct. 20, 2022

Related U.S. Application Data

(63) Continuation of application No. PCT/JP2020/047187, filed on Dec. 17, 2020.

(30) Foreign Application Priority Data

Mar. 24, 2020 (JP) ................................ 2020-052621

(51) Int. Cl.
*H04R 5/033* (2006.01)
*H04R 1/10* (2006.01)

(52) U.S. Cl.
CPC ........... *H04R 1/1041* (2013.01); *H04R 5/033* (2013.01); *H04R 2420/07* (2013.01); *H04R 2430/01* (2013.01)

(58) Field of Classification Search
None
See application file for complete search history.

(56) References Cited

U.S. PATENT DOCUMENTS

2009/0023417 A1* 1/2009 Davis ................ H04M 1/72513 455/403
2009/0154720 A1* 6/2009 Oki ...................... H04R 1/1041 381/74

(Continued)

FOREIGN PATENT DOCUMENTS

JP 2019180082 A 10/2019

*Primary Examiner* — James K Mooney
(74) *Attorney, Agent, or Firm* — Procopio, Cory, Hargreaves & Savitch LLP

(57) ABSTRACT

A sound input-output control apparatus includes a posture calculation unit configured to calculate postures of a plurality of respective sound output apparatuses each independently mounted on a user, a synchronousness determination unit configured to determine whether changes in at least two postures among the postures of the plurality of sound output apparatuses are synchronized, and an operation control unit configured to control operation of each of the sound output apparatuses, the operation control unit controls each of the sound output apparatuses to perform first operation when changes in the postures are synchronized, and the operation control unit controls each of the sound output apparatuses to perform second operation when it is determined that changes in the postures are not synchronized.

4 Claims, 6 Drawing Sheets

(56) References Cited

U.S. PATENT DOCUMENTS

| | | | | |
|---|---|---|---|---|
| 2013/0279724 | A1* | 10/2013 | Stafford | H04R 1/1041 381/74 |
| 2018/0359348 | A1* | 12/2018 | Katkam | G06F 3/165 |
| 2019/0166428 | A1 | 5/2019 | Bae et al. | |
| 2019/0222913 | A1 | 7/2019 | Leclerc et al. | |
| 2019/0222915 | A1 | 7/2019 | Laurent et al. | |
| 2019/0222936 | A1 | 7/2019 | Degner et al. | |
| 2019/0230427 | A1 | 7/2019 | Degner et al. | |
| 2019/0238963 | A1 | 8/2019 | Bloom | |
| 2021/0029436 | A1 | 1/2021 | Degner et al. | |
| 2021/0152941 | A1 | 5/2021 | Degner et al. | |
| 2021/0168506 | A1 | 6/2021 | Degner et al. | |

* cited by examiner

SOUND INPUT-OUTPUT CONTROL APPARATUS, SOUND INPUT-OUTPUT CONTROL METHOD, AND NON-TRANSITORY COMPUTER-READABLE MEDIUM

CROSS REFERENCE TO RELATED APPLICATION

This application is based upon and claims the benefit of priority from Japanese patent application No. 2020-52621, filed on Mar. 24, 2020, the disclosure of which is incorporated herein in its entirety by reference.

BACKGROUND

The present invention relates to a sound input-output control apparatus, a sound input-output control method, and a program.

Patent Literature 1 (Japanese Unexamined Patent Application Publication No. 2019-180082) discloses a technology of measuring angular orientations of right and left earphones of a headphone and determining, based on the measured angular orientations, whether the headphone is mounted on the head of a user and which of the earphones covers the left ear or right ear of the user. Patent Literature 1 also discloses switching between music playback and standby and switching of an earphone to which a left-ear or right-ear sound signal is output, in accordance with a result of the above-described determination.

SUMMARY

Full-wireless earphones (true wireless stereo (TWS)) that are completely wireless right and left earphones have been spreading recently. The full-wireless earphones output sound in a stereo-scheme from the right and left earphones. The present inventors have come up with a technology that enables an operation mode other than a normal operation mode of stereo-scheme sound output for a plurality of sound output apparatuses that are independently usable like full-wireless earphones.

A sound input-output control apparatus according to the present embodiments is a sound input-output control apparatus configured to control a plurality of sound output apparatuses each independently mounted on a user and configured to output sound toward the user, the sound input-output control apparatus including a posture calculation unit configured to calculate postures of respective sound output apparatuses based on a posture signal detected by the respective sound output apparatuses, a synchronousness determination unit configured to determine whether changes in at least two postures among the postures of the plurality of sound output apparatuses, which are calculated by the posture calculation unit, are synchronized, and an operation control unit configured to control operation of each of the sound output apparatuses, the operation control unit controls each of the sound output apparatuses to perform first operation when it is determined by the synchronousness determination unit that changes in at least two postures among the postures of the plurality of sound output apparatuses are synchronized, and the operation control unit controls each of the sound output apparatuses to perform second operation when it is determined by the synchronousness determination unit that changes in at least two postures among the postures of the plurality of sound output apparatuses are not synchronized.

A sound input-output control method according to the present embodiments is a sound input-output control method in which a plurality of sound output apparatuses each independently mounted on a user and configured to output sound toward the user are controlled by a sound input-output control apparatus, the sound input-output control apparatus calculating postures of respective sound output apparatuses based on a posture signal detected by the respective sound output apparatuses, determining whether changes in at least two postures among the calculated postures of the plurality of sound output apparatuses are synchronized, controlling each of the sound output apparatuses to perform first operation when having determined that changes in at least two postures among the postures of the plurality of sound output apparatuses are synchronized, and controlling each of the sound output apparatuses to perform second operation when having determined that changes in at least two postures among the postures of the plurality of sound output apparatuses are not synchronized.

A program according to the present embodiments is a program that causes a sound input-output control apparatus to execute processing of controlling a plurality of sound output apparatuses each independently mounted on a user and configured to output sound toward the user, the program causing the sound input-output control apparatus to execute processing of calculating postures of respective sound output apparatuses based on a posture signal detected by the respective sound output apparatuses, processing of determining whether changes in at least two postures among the calculated postures of the plurality of sound output apparatuses are synchronized, processing of controlling each of the sound output apparatuses to perform first operation when having determined that changes in at least two postures among the postures of the plurality of sound output apparatuses are synchronized, and processing of controlling each of the sound output apparatuses to perform second operation when having determined that changes in at least two postures among the postures of the plurality of sound output apparatuses are not synchronized.

DETAILED DESCRIPTION

First Embodiment

Embodiments of the present invention will be described below with reference to the accompanying drawings.

Figure 1:
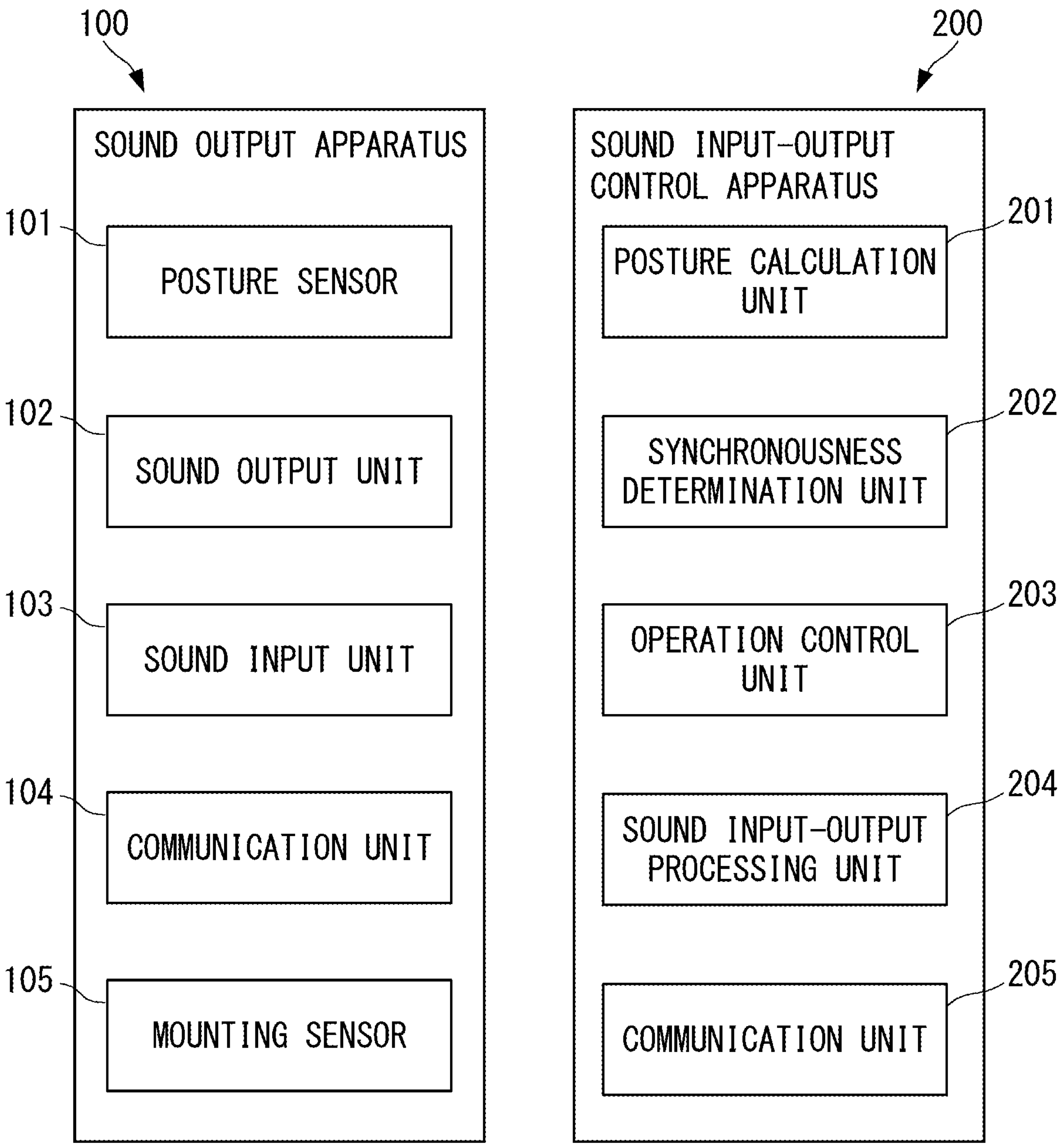
FIG. 1 is a block diagram schematically illustrating the configuration of a sound input-output control apparatus according to a first embodiment of the present invention.

FIG. 1 is a block diagram schematically illustrating the configuration of a sound input-output control apparatus 200 according to a first embodiment of the present invention. The sound input-output control apparatus 200 controls operation of a sound output apparatus 100 illustrated in FIG. 1. Specifically, the sound input-output control apparatus 200 controls a plurality of sound output apparatuses 100 each independently mounted on a user and configured to output sound toward the user. Accordingly, the sound input-output control apparatus 200 can provide wider usage to the sound output apparatuses 100.

Each sound output apparatus 100 is, for example, a completely independent individual earphone such as a full-wireless earphone or a full-wireless bone-conduction earphone, and independently mounted on, for example, the right or left ear of a user. In other words, the plurality of sound output apparatuses 100 are mounted completely independently from each other on a user. Typically, full-wireless earphones, full-wireless bone-conduction earphones, or the like are provided in a set of two completely independent earphones. However, in the present invention, the sound output apparatuses 100 may be provided in a set of three or more apparatuses. The plurality of sound output apparatuses 100 may be independently mounted on the right and left cheekbones of the user and may be neck-mounted speakers or wearable speakers. The sound output apparatuses 100 are not limited to a full-wireless type but some of them may be of wired connection.

As illustrated in FIG. 1, each sound output apparatus 100 according to the first embodiment includes a posture sensor 101, a sound output unit 102, a sound input unit 103, a communication unit 104, and a mounting sensor 105. Note that at least one sound output apparatus 100 in the set of sound output apparatuses 100 needs to include the sound input unit 103, and the other sound output apparatuses 100 may include no sound input unit 103. Each sound output apparatus 100 may include no mounting sensor 105. The set of sound output apparatuses 100 may each include no sound input unit 103.

The posture sensor 101 is a sensor configured to detect the posture of the corresponding sound output apparatus 100 including the posture sensor 101 and is, for example, a three-axis azimuth sensor (geomagnetic sensor), a three-axis angular velocity sensor (gyro sensor), a three-axis acceleration sensor, or a Global Navigation Satellite System (GNSS) receiver. A posture signal detected by the posture sensor 101 is transmitted to the sound input-output control apparatus 200 by the communication unit 104. When the posture sensor 101 is a three-axis azimuth sensor, the posture sensor 101 detects a posture signal related to the direction of the sound output apparatus 100. When the posture sensor 101 is a three-axis angular velocity sensor, the posture sensor 101 detects posture signals related to the rotation angles of the sound output apparatus 100 about three axes. When the posture sensor 101 is a three-axis acceleration sensor, the posture sensor 101 detects posture signals related to the rotation angles of the sound output apparatus 100 about two axes orthogonal to the gravitational acceleration direction. When the posture sensor 101 is a GNSS receiver, the posture sensor 101 detects a posture signal related to the traveling direction of the sound output apparatus 100.

The sound output unit 102 includes a speaker or a bone-conduction speaker or the like and outputs sound toward the user in accordance with a sound signal acquired from a portable instrument such as a smartphone or from a music playback apparatus (not illustrated) such as a digital audio player (DAP) or a CD player. The sound signal from the music playback apparatus may be received by the communication unit 104 through the sound input-output control apparatus 200 or may be directly received by the communication unit 104 not through the sound input-output control apparatus 200.

The sound output unit 102 may output sound toward the user in accordance with a sound signal received by the communication unit 104 from another sound output apparatus 100. Specifically, the sound input unit 103 of the other sound output apparatus 100 acquires a sound signal by collecting sound, and the sound output unit 102 outputs the sound in accordance with the sound signal received by the communication unit 104 from the other sound output apparatus 100.

The sound input unit 103 is a microphone or the like and acquires a sound signal by collecting sound of the user on which the sound output apparatus 100 is mounted. Note that the sound input unit 103 can collect sound of the user with the sound output apparatus 100 being mounted on an ear of the user. The sound signal acquired by the sound input unit 103 is transmitted to the sound input-output control apparatus 200 or another sound output apparatus 100 by the communication unit 104. Note that the sound input unit 103 may be included in every sound output apparatus 100 in the set of sound output apparatuses 100 or may be included in at least one sound output apparatus 100. When the sound input unit 103 is included only in one sound output apparatus 100 in the set of sound output apparatuses 100, the sound output apparatus 100 including the sound input unit 103 may be set as a master apparatus and any other sound output apparatus 100 may be set as a slave apparatus.

The communication unit 104 performs communication between the sound output apparatus 100 including the communication unit 104 and any other sound output apparatus 100 and the sound input-output control apparatus 200, or the above-described music playback apparatus (not illustrated).

Communication between sound output apparatuses 100 is near-field magnetic induction (NFMI) communication, and short-distance wireless communication such as Bluetooth (registered trademark), wireless LAN such as Wi-Fi (registered trademark), infrared communication, or near-field communication (NFC). Which of the communications is used as communication between sound output apparatuses 100 may be switched in accordance with the distance between the sound output apparatuses 100.

Communication between each sound output apparatus 100 and the sound input-output control apparatus 200 is, for example, short-distance wireless communication such as Bluetooth (registered trademark), wireless LAN such as Wi-Fi (registered trademark), infrared communication, or NFC. Which of the communications is used as communication between each sound output apparatus 100 and the sound input-output control apparatus 200 may be switched in accordance with the distance between the sound output apparatus 100 and the sound input-output control apparatus 200.

The mounting sensor 105 is a sensor configured to detect that the corresponding sound output apparatus 100 is mounted on a user. Specifically, the mounting sensor 105 is, for example, an infrared sensor or a pressure-sensitive sensor. A mounting detection signal detected by the mounting sensor 105 is transmitted to the sound input-output control apparatus 200 by the communication unit 104.

As described above, the sound input-output control apparatus 200 controls the plurality of sound output apparatuses 100 each independently mounted on a user and configured to output sound toward the user. For example, the sound input-output control apparatus 200 controls at least two sound output apparatuses 100 in the set of sound output apparatuses 100. As illustrated in FIG. 1, the sound input-output control apparatus 200 includes a posture calculation unit 201, a synchronousness determination unit 202, an operation control unit 203, a sound input-output processing unit 204, and a communication unit 205.

The posture calculation unit 201 calculates postures of respective sound output apparatuses 100 based on a posture signal detected by the respective sound output apparatuses 100. Specifically, the posture calculation unit 201 individually acquires a posture signal from each sound output apparatus 100 in the set and calculates the posture of the sound output apparatus 100 based on the posture signal.

Specifically, the posture calculation unit 201 calculates the direction of each sound output apparatus 100 when the posture sensor 101 of the sound output apparatus 100 is a three-axis azimuth sensor. The posture calculation unit 201 calculates the angular velocity of motion of each sound output apparatus 100 when the posture sensor 101 of the sound output apparatus 100 is a three-axis angular velocity sensor. The posture calculation unit 201 calculates the posture of each sound output apparatus 100 with respect to the direction of gravity or the acceleration of motion of each sound output apparatus 100 when the posture sensor 101 of the sound output apparatus 100 is a three-axis acceleration sensor. The posture calculation unit 201 calculates the traveling direction, moving distance, or moving speed of each sound output apparatus 100 when the posture sensor 101 is a GNSS receiver.

The synchronousness determination unit 202 determines whether changes in the postures of the plurality of sound output apparatuses 100, which are calculated by the posture calculation unit 201, are synchronized. Specifically, the synchronousness determination unit 202 determines whether changes in the respective postures of the sound output apparatuses 100 in the set, which are calculated by the posture calculation unit 201, are synchronized.

When the plurality of sound output apparatuses 100 are mounted on the right and left ears of the same user and, for example, the user is walking, the plurality of sound output apparatuses 100 detect motion (posture change) of the same speed and the same direction in the front-back direction when viewed from the user and motion of vibration in substantially the same rhythm in the up-down direction and detect substantially no posture change in the right-left direction. For example, when the user performs motion of twisting the neck, the plurality of sound output apparatuses 100 detect rotational motion of the same speed and opposite directions in the front-back and right-left directions when viewed from the user and detect substantially no posture change in the up-down direction. Motion of the same speed and the same direction, motion of the same speed and opposite directions, or the like is determined in accordance with motion in which, for example, the user looks down, jumps, or lies, and synchronization of posture changes is determined based on these motions.

In a case of obliquely twisting motion, rotational motion centered at the left shoulder or right shoulder of a user, or the like, speeds do not match even when the plurality of sound output apparatuses 100 are mounted on the right and left ears of the same user, and thus there is preferably provided with a function that improves the accuracy of determination by machine learning or the like.

"Posture change" means change from the posture of each of a plurality of sound output apparatuses 100 when the plurality of sound output apparatuses 100 are mounted on the same user. For example, the posture calculation unit 201 potentially detects, as opposite directions, the directions of each of the sound output apparatuses 100 squarely mounted on, for example, the left and right ears of the same user. In other cases, the axial direction of the right ear hole of the user potentially does not match the axial direction of the left ear hole. Thus, the synchronousness determination unit 202 preferably has a calibration function to store in advance initial values of the postures of two sound output apparatuses 100 when mounted on the right and left ears of the user and correct, based on initial values of the posture, values of the postures of two sound output apparatuses 100, which are calculated by the posture calculation unit 201. Specifically, when the posture calculation unit 201 calculates the directions of the sound output apparatuses 100, the synchronousness determination unit 202 corrects a directional difference due to a right-left difference of the user by correcting a calculation value of the sound output apparatus 100 mounted on one side by using the difference between the above-described initial values, thereby performing calibration to enable determination that the postures of the two sound output apparatuses 100 when mounted on the right and left ears of the same user are identical. Accordingly, the synchronousness determination unit 202 can accurately compare changes from the postures of each of a plurality of sound output apparatuses 100 when the plurality of sound output apparatuses 100 are mounted on the same user. Similarly, the synchronousness determination unit 202 performs correction by using initial values for other postures calculated by the posture calculation unit 201.

Specifically, for example, when the direction of each sound output apparatus 100 is calculated by the posture calculation unit 201, the synchronousness determination unit 202 determines whether changes in the postures of the plurality of sound output apparatuses 100 are synchronized based on whether changes in the directions of the plurality of sound output apparatuses 100 match. When the angular velocity of motion of each sound output apparatus 100 is calculated by the posture calculation unit 201, the synchronousness determination unit 202 determines whether changes in the postures of the plurality of sound output apparatuses 100 are synchronized based on whether changes in the angular velocities of motion of the plurality of sound output apparatuses 100 match. When the acceleration of the posture or motion of each sound output apparatus 100 in accordance with the gravitational force is calculated by the posture calculation unit 201, the synchronousness determination unit 202 determines whether changes in the postures of the plurality of sound output apparatuses 100 are synchronized based on whether changes in the accelerations of the postures or motions of the plurality of sound output apparatuses 100 in accordance with the gravitational force match. When the traveling direction of each sound output apparatus 100 is calculated by the posture calculation unit 201, the synchronousness determination unit 202 determines whether changes in the postures of the plurality of sound output apparatuses 100 are synchronized based on whether changes in the traveling directions, moving distances, or moving speeds of the plurality of sound output apparatuses 100 match.

The operation control unit 203 controls operation of each sound output apparatus 100 in the set of sound output apparatuses 100.

Specifically, when it is determined by the synchronousness determination unit 202 that changes in the postures of the plurality of sound output apparatuses 100 are synchronized, the operation control unit 203 controls each sound output apparatus 100 to perform first operation that is suitable for a case in which the sound output apparatuses 100 are mounted on the same user, for example, operation of playing back a sound signal acquired from the music playback apparatus in a stereo mode. When it is determined that changes in the postures acquired from the sound output apparatuses 100 are synchronized, the operation control unit 203 may perform operation designated by the user or continue normal operation without performing specified operation as the first operation. In other words, the first operation does not necessarily need to be particularly designated operation.

When it is determined by the synchronousness determination unit 202 that changes in the postures of the plurality of sound output apparatuses 100 are not synchronized, the operation control unit 203 controls each sound output apparatus 100 to perform second operation that is suitable for a case in which the sound output apparatuses 100 are mounted on different users, for example, operation of playing back a sound signal acquired from the music playback apparatus in a monaural mode.

The above-described first operation and the above-described second operation will be described later in detail.

Thus, in a case in which the set of sound output apparatuses 100 consists of two sound output apparatuses 100, the sound input-output control apparatus 200 according to the first embodiment determines that the two sound output apparatuses 100 are mounted on the same user when changes in the postures of the two sound output apparatuses 100 are synchronized. Then, the sound input-output control apparatus 200 controls the two sound output apparatuses 100 to perform the above-described first operation.

In a case in which the set of sound output apparatuses 100 consists of two sound output apparatuses 100, the sound input-output control apparatus 200 determines that the two sound output apparatuses 100 are mounted on different users when changes in the postures of the two sound output apparatuses 100 are not synchronized. Then, the sound input-output control apparatus 200 controls the two sound output apparatuses 100 to perform the above-described second operation.

In a case in which the set of sound output apparatuses 100 consists of three or more sound output apparatuses 100, the sound input-output control apparatus 200 determines that two sound output apparatuses 100 in the set of sound output apparatuses 100 are mounted on the same user when changes in the postures of the two sound output apparatuses 100 are synchronized. Simultaneously, when change in the posture of the other sound output apparatus 100 in the set of sound output apparatuses 100 is not synchronized, the sound input-output control apparatus 200 determines that the other sound output apparatus 100 in the set of sound output apparatuses 100 is mounted on a different user. Then, the sound input-output control apparatus 200 controls the two sound output apparatuses 100 to perform the above-described first operation and controls the other sound output apparatus 100 to perform the above-described second operation.

In a case in which the set of sound output apparatuses 100 consists of three or more sound output apparatuses 100, the sound input-output control apparatus 200 determines that the sound output apparatuses 100 are mounted on different users when no changes in the postures of the sound output apparatuses 100 are synchronized. Then, the sound input-output control apparatus 200 controls the sound output apparatuses 100 to perform the above-described second operation.

The sound input-output processing unit 204 generates a sound signal to be transmitted to each sound output apparatus 100 by performing predetermined processing on a sound signal received by the communication unit 205 from the music playback apparatus (not illustrated). For example, the sound input-output processing unit 204 generates a stereo-scheme sound signal or a monaural-scheme sound signal. Then, the sound signal generated by the sound input-output processing unit 204 is transmitted to each sound output apparatus 100 by the communication unit 205.

For example, when the set of sound output apparatuses 100 consists of a right-ear sound output apparatus 100 and a left-ear sound output apparatus 100 and the sound output apparatuses 100 are mounted on the same user, the first operation is performed in which the sound input-output processing unit 204 generates a right-ear sound signal and a left-ear sound signal and the communication unit 205 transmits the right-ear sound signal generated by the sound input-output processing unit 204 to the right-ear sound output apparatus 100 and transmits the left-ear sound signal generated by the sound input-output processing unit 204 to the left-ear sound output apparatus 100. In other words, the first operation is stereo-scheme sound signal playback operation (one-person mode).

When the set of sound output apparatuses 100 are mounted on different users, the second operation is performed in which the sound input-output processing unit 204 generates a monaural-scheme sound signal and the communication unit 205 transmits the monaural-scheme sound signal to each sound output apparatus 100. In other words, the second operation is monaural-scheme sound signal playback operation (two-person mode).

When the set of sound output apparatuses 100 are mounted on different users, the second operation may be performed in which the sound input-output processing unit 204 acquires a sound signal collected by the sound input unit 103 and the communication unit 205 transmits the collected sound signal to another sound output apparatus 100. In other words, the second operation may be communication operation (transceiver mode) between different users through the sound output apparatuses 100. In the transceiver mode, transmission-reception may be unidirectional, or bidirectional transmission-reception may be possible.

The second operation may be an operation mode in which, for example, sound volume or sound quality adjustment of sound output can be separately set as described later.

The communication unit 205 performs communication between the sound input-output control apparatus 200 and each sound output apparatus 100 and communication between the sound input-output control apparatus 200 and the music playback apparatus (not illustrated).

Communication between the sound input-output control apparatus 200 and each sound output apparatus 100 and communication between the sound input-output control apparatus 200 and the music playback apparatus are, for example, short-distance wireless communication such as Bluetooth (registered trademark), wireless LAN such as Wi-Fi (registered trademark), infrared communication, or NFC. Which of the communications is used as communication between the sound input-output control apparatus 200 and each sound output apparatus 100 and between the sound input-output control apparatus 200 and the music playback apparatus may be switched in accordance with the distance between the sound input-output control apparatus 200 and the sound output apparatus 100 and between the sound input-output control apparatus 200 and the music playback apparatus.

Note that the sound input-output control apparatus 200 may be integrated with a portable instrument such as a smartphone or with a music playback apparatus such as a DAP or a CD player. In this case, the communication unit 205 performs communication between the sound input-output control apparatus 200 and each sound output apparatus 100. An application program that causes the music playback apparatus to execute the above-described function of the sound input-output control apparatus 200 may be installed.

Two or more kinds of sensors among a three-axis azimuth sensor (geomagnetic sensor), a three-axis angular velocity sensor (gyro sensor), a three-axis acceleration sensor, a GNSS receiver, and the like may be mounted as the posture sensor 101 on each sound output apparatus 100. The postures of the plurality of sound output apparatuses 100 can be detected at higher accuracy when two or more kinds of sensors are mounted as the posture sensor 101 on each sound output apparatus 100. For example, in a case in which only a three-axis angular velocity sensor is mounted as the posture sensor 101, changes in the angular velocities of motions of two sound output apparatuses 100 are zero when two users stay at certain positions with one sound output apparatus 100 mounted on each of the two users. Thus, the synchronousness determination unit 202 determines that changes in the postures of the two sound output apparatuses 100 are synchronized, and the sound input-output control apparatus 200 determines that the two sound output apparatuses 100 are mounted on the same user. However, in a case in which not only a three-axis angular velocity sensor but also a three-axis azimuth sensor are mounted as the posture sensor 101, it is possible to detect that changes in the directions of the two sound output apparatuses 100 do not match when the two users stay at certain positions but face in different directions.

Alternatively, only a three-axis azimuth sensor or a three-axis acceleration sensor may be mounted as the posture sensor 101.

When a three-axis acceleration sensor is included as the posture sensor 101, the posture calculation unit 201 may calculate movement of each sound output apparatus 100 based on movement of three axes due to change in the position of the sound output apparatus 100. Then, the synchronousness determination unit 202 may determine whether changes in the postures of the plurality of sound output apparatuses 100 are synchronized based on whether movements of the plurality of sound output apparatuses 100 match.

Second Embodiment

Figure 2:
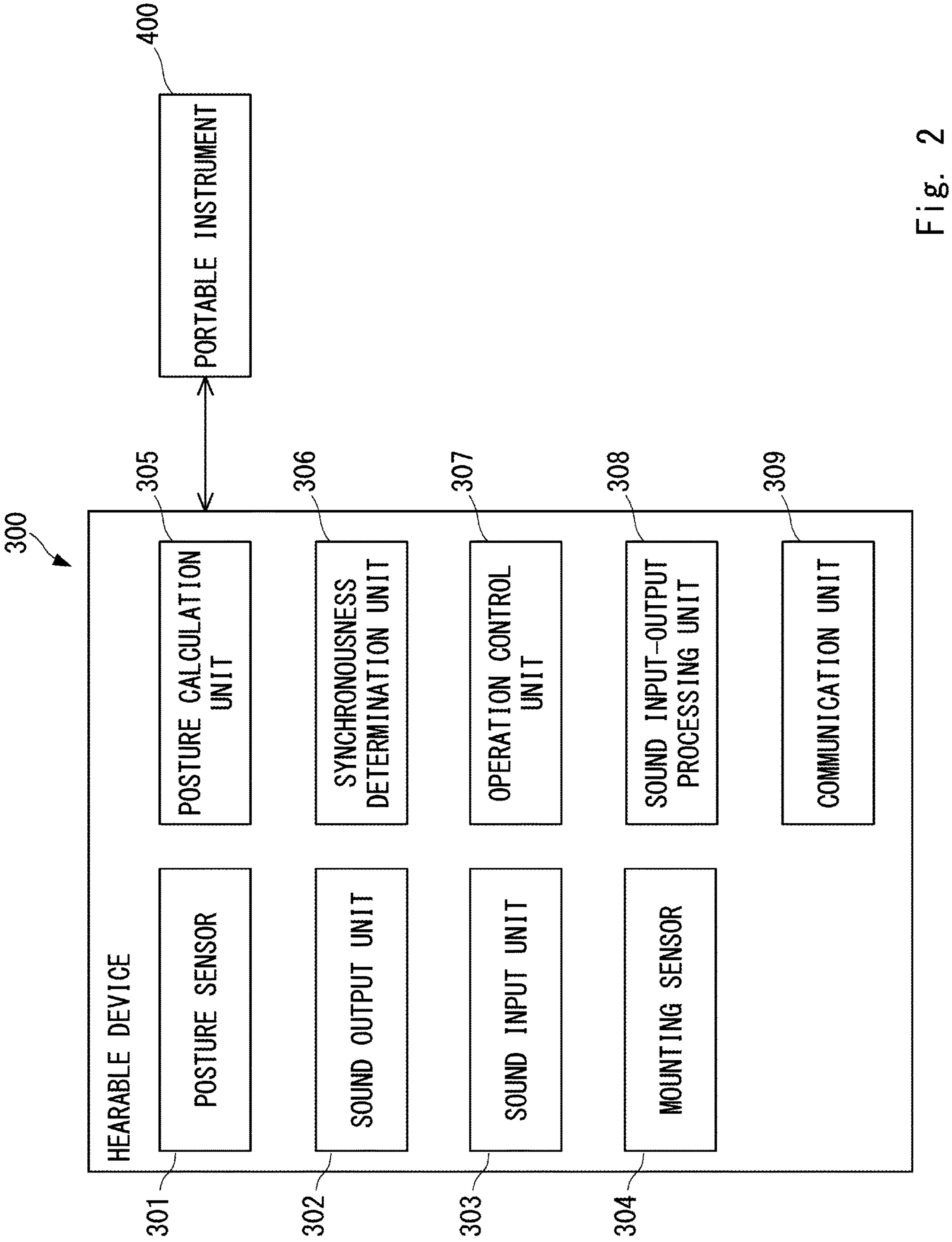
FIG. 2 is a block diagram schematically illustrating the configuration of a sound input-output control apparatus according to a second embodiment of the present invention.

FIG. 2 is a block diagram schematically illustrating the configuration of a hearable device 300 as a sound input-output control apparatus according to a second embodiment of the present invention. The hearable device 300 according to the second embodiment is an integration of each sound output apparatus 100 and the sound input-output control apparatus 200 according to the first embodiment. Accordingly, functions of a posture sensor 301, a sound output unit 302, a sound input unit 303, a mounting sensor 304, a posture calculation unit 305, a synchronousness determination unit 306, an operation control unit 307, and a sound input-output processing unit 308 included in the hearable device 300 are the same as those of the posture sensor 101, the sound output unit 102, the sound input unit 103, the mounting sensor 105, the posture calculation unit 201, the synchronousness determination unit 202, the operation control unit 203, and the sound input-output processing unit 204 illustrated in FIG. 1. Functions of a communication unit 309 included in the hearable device 300 are the same as an integration of functions of the communication unit 104 and functions of the communication unit 205 illustrated in FIG. 1. Thus, description is omitted for the same functions as those of the posture sensor 101, the sound output unit 102, the sound input unit 103, the mounting sensor 105, the posture calculation unit 201, the synchronousness determination unit 202, the operation control unit 203, the sound input-output processing unit 204, the communication unit 104, and the communication unit 205 among functions of the posture sensor 301, the sound output unit 302, the sound input unit 303, the mounting sensor 304, the posture calculation unit 305, the synchronousness determination unit 306, the operation control unit 307, the sound input-output processing unit 308, and the communication unit 309.

Similarly to each sound output apparatus 100 according to the first embodiment, the hearable device 300 is independently mounted on a user and outputs sound toward the user. Specifically, the hearable device 300 is a completely independent individual earphone such as a full-wireless earphone or a full-wireless bone-conduction earphone and is independently mounted on each of the right and left ears of the user. In other words, a plurality of hearable devices 300 are mounted completely independently from each other on the user. Typically, full-wireless earphones, full-wireless bone-conduction earphones, or the like are provided in a set of two completely independent earphones. However, in the present invention, the hearable devices 300 may be provided in a set of three or more hearable devices 300.

As illustrated in FIG. 2, the hearable device 300 according to the second embodiment includes the posture sensor 301, the sound output unit 302, the sound input unit 303, the mounting sensor 304, the posture calculation unit 305, the synchronousness determination unit 306, the operation control unit 307, the sound input-output processing unit 308, and the communication unit 309. Note that at least one hearable device 300 in the set of hearable devices 300 needs to include the sound input unit 303, the posture calculation unit 305, the synchronousness determination unit 306, and the operation control unit 307, and any other hearable device 300 may include none of the sound input unit 303, the posture calculation unit 305, the synchronousness determination unit 306, the operation control unit 307. When the sound input unit 303, the posture calculation unit 305, the synchronousness determination unit 306, and the operation control unit 307 are included only in one hearable device 300 in the set of hearable devices 300, the hearable device 300 including the sound input unit 303, the posture calculation unit 305, the synchronousness determination unit 306, the operation control unit 307 may be set as a master apparatus and any other hearable device 300 may be set as a slave apparatus.

Each hearable device 300 may include no mounting sensor 304.

A posture signal detected by the posture sensor 301 is input to the posture calculation unit 305. The posture signal detected by the posture sensor 301 is also transmitted to any other hearable device 300 by the communication unit 309.

The sound output unit 302 outputs sound toward the user in accordance with a sound signal received by the communication unit 309 from a portable instrument 400 as a music playback apparatus.

The sound output unit 302 outputs sound toward the user in accordance with a sound signal received by the communication unit 309 from another hearable device 300.

A sound signal acquired by the sound input unit 303 is transmitted to another hearable device 300 by the communication unit 309.

The posture calculation unit 305 calculates the posture of each hearable device 300 in the set based on a posture signal detected by the posture sensor 301 in the hearable device 300.

For example, when the posture calculation unit 305 is included in each hearable device 300 in the set, the posture calculation unit 305 calculates the posture of the hearable device 300 including the posture calculation unit 305 based on a posture signal detected by the posture sensor 301 of the hearable device 300. Then, the posture of the hearable device 300, which is calculated by the posture calculation unit 305 is transmitted to another hearable device 300 by the communication unit 309.

When the posture calculation unit 305 is included only in one hearable device 300 in the set of hearable devices 300, the posture calculation unit 305 calculates the posture of the hearable device 300 including the posture calculation unit 305 based on a posture signal detected by the posture sensor 301 of the hearable device 300. The posture calculation unit 305 also calculates the posture of another hearable device 300 based on a posture signal detected by the posture sensor 301 of the other hearable device 300, which is received by the communication unit 309.

The synchronousness determination unit 306 determines whether changes in respective postures of the hearable devices 300 in the set are synchronized based on the respective postures of the hearable devices 300 in the set, which are calculated by the posture calculation unit 305. The synchronization determination by the synchronousness determination unit 306 may be performed at each hearable device 300 in the set. When the posture calculation unit 305 and the synchronousness determination unit 306 are included only in one hearable device 300 in the set of hearable devices 300, a posture calculated by the posture calculation unit 305 may be transmitted to the one hearable device 300 from another hearable device 300 and the synchronization determination by the synchronousness determination unit 306 of the one hearable device 300 may be performed.

The operation control unit 307 controls operation of the hearable device 300.

The operation control by the operation control unit 307 may be performed at each hearable device 300 in the set. For example, when change in the posture of one of two hearable devices 300 in the set of hearable devices 300 and change in the posture of the other hearable device 300 are synchronized, the operation control unit 307 of each of the two hearable devices 300 controls the hearable device 300 to perform the above-described first operation. The operation control unit 307 of any hearable device 300 other than the above-described two hearable devices 300 in the set of hearable devices 300 controls the hearable device 300 to perform the above-described second operation.

When changes in the postures of all of the respective hearable devices 300 in the set are not synchronized, the operation control unit 307 of each hearable device 300 controls the hearable device 300 to perform the second operation.

When the posture calculation unit 305, the synchronousness determination unit 306, and the operation control unit 307 are included only in one hearable device 300 in the set of hearable devices 300, the operation control unit 307 of the one hearable device 300 may control operation of another hearable device 300. For example, when change in the posture of one of two hearable devices 300 in the set of hearable devices 300 and change in the posture of the other hearable device 300 are synchronized, the operation control unit 307 controls the two hearable devices 300 to perform the above-described first operation. The operation control unit 307 controls any hearable device 300 other than the above-described two hearable devices 300 in the set of hearable devices 300 to perform the above-described second operation.

When changes in the postures of all hearable devices 300 in the set are not synchronized, the operation control unit 307 controls each hearable device 300 to perform the second operation.

The first operation and the second operation are equivalent to those in the first embodiment.

The sound input-output processing unit 308 generates a sound signal to be input to the sound output unit 302 by performing predetermined processing on a sound signal received from the portable instrument 400 as a music playback apparatus by the communication unit 309.

For example, when the set of hearable devices 300 consists of a right-ear hearable device 300 and a left-ear hearable device 300 and these hearable devices 300 are mounted on the same user, the sound input-output processing unit 308 of the right-ear hearable device 300 generates a right-ear sound signal and the sound input-output processing unit 308 of the left-ear hearable device 300 generates a left-ear sound signal.

When the hearable devices 300 in the set are mounted on different users, the sound input-output processing unit 308 of each hearable device 300 generates a monaural-scheme sound signal.

The communication unit 309 performs communication between the hearable device 300 including the communication unit 309 and another hearable device 300. The communication unit 309 also performs communication between the hearable device 300 including the communication unit 309 and the portable instrument 400 as a music playback apparatus.

Communication between hearable devices 300 is, for example, near-field magnetic induction communication, and short-distance wireless communication such as Bluetooth (registered trademark), wireless LAN such as Wi-Fi (registered trademark), infrared communication, or NFC. Which of the communications is used as communication between hearable devices 300 may be switched in accordance with the distance between the hearable devices 300.

Communication between each hearable device 300 and the portable instrument 400 is, for example, short-distance wireless communication such as Bluetooth (registered trademark), wireless LAN such as Wi-Fi (registered trademark), infrared communication, or NFC. Which of the communications is used as communication between each hearable device 300 and the portable instrument 400 may be switched in accordance with the distance between the hearable device 300 and the portable instrument 400.

Note that the music playback apparatus may be not only the portable instrument 400 such as a smartphone described above but also a DAP, a CD player, or the like. A hearable device 300 may be integrated with the music playback apparatus.

Subsequently, exemplary sound input-output control methods according to the first embodiment or second embodiment of the present invention will be described below with reference to FIGS. 3 to 6. Note that the following description is made on an example in which the set of sound output apparatuses 100 or the set of hearable devices 300 consists of two sound output apparatuses 100 or two hearable devices 300, one of the sound output apparatuses 100 or the hearable devices 300 is a master apparatus, and the other sound output apparatus 100 or hearable device 300 is a slave apparatus.

The following description is also made on the process of processing at the sound input-output control apparatus 200 according to the first embodiment as an example. The same description applies to the process of processing at the hearable device 300 according to the second embodiment when processing by the posture sensor 101, the sound output unit 102, the sound input unit 103, the mounting sensor 105, the posture calculation unit 201, the synchronousness determination unit 202, the operation control unit 203, the sound input-output processing unit 204, the communication unit 104, and the communication unit 205 is interpreted as processing by the posture sensor 301, the sound output unit 302, the sound input unit 303, the mounting sensor 304, the posture calculation unit 305, the synchronousness determination unit 306, and the operation control unit 307, the sound input-output processing unit 308, and the communication unit 309, respectively, and thus description thereof is omitted.

Figure 3:
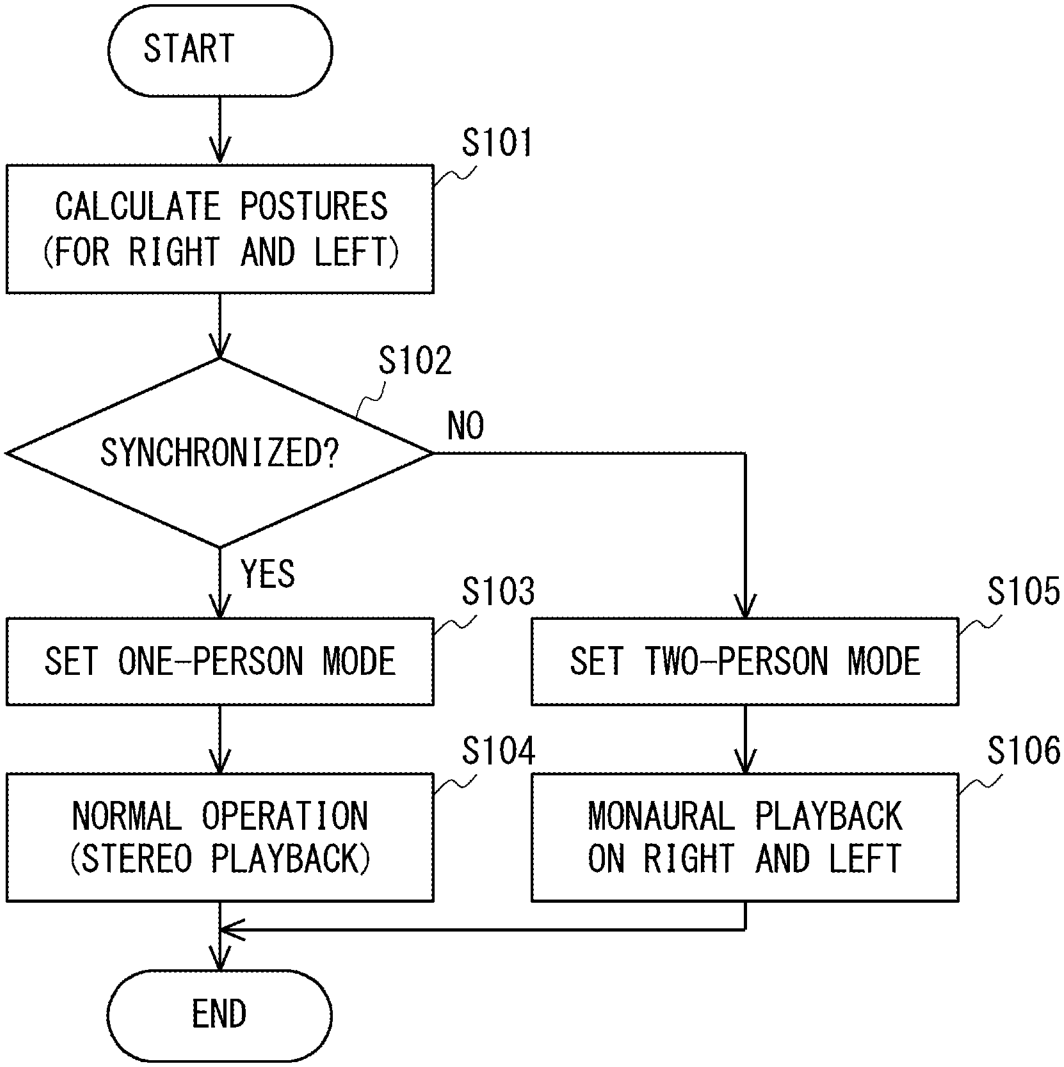
FIG. 3 is a flowchart illustrating an exemplary sound input-output control method according to the first embodiment or second embodiment of the present invention.

First, an exemplary sound input-output control method illustrated in FIG. 3 will be described below.

The posture calculation unit 201 first calculates the posture of each sound output apparatus 100 in the set of sound output apparatuses 100 based on a posture signal of the sound output apparatus 100, which is detected by the respective sound output apparatus 100 (step S101). Specifically, the posture calculation unit 201 calculates the posture of the right-ear sound output apparatus 100 and the posture of the left-ear sound output apparatus 100.

Subsequently, the synchronousness determination unit 202 determines whether changes in the postures of the right-ear sound output apparatus 100 and the left-ear sound output apparatus 100, which are calculated by the posture calculation unit 201, are synchronized (step S102).

At step S102, when changes in the postures of the right-ear sound output apparatus 100 and the left-ear sound output apparatus 100 are synchronized (Yes at step S102), the operation control unit 203 controls the right-ear sound output apparatus 100 and the left-ear sound output apparatus 100 to operate in the one-person mode (first operation) (step S103).

Then, the normal operation is performed at the right-ear sound output apparatus 100 and the left-ear sound output apparatus 100 (step S104). Specifically, the sound input-output processing unit 204 generates a right-ear sound signal and a left-ear sound signal, and the communication unit 205 transmits the right-ear sound signal to the right-ear sound output apparatus 100 and transmits the left-ear sound signal to the left-ear sound output apparatus 100. Then, the sound output unit 102 of the right-ear sound output apparatus 100 outputs sound toward the user in accordance with the right-ear sound signal, and the sound output unit 102 of the left-ear sound output apparatus 100 outputs sound toward the user in accordance with the left-ear sound signal.

At step S102, when changes in the postures of the right-ear sound output apparatus 100 and the left-ear sound output apparatus 100 are not synchronized (No at step S102), the operation control unit 203 controls the right-ear sound output apparatus 100 and the left-ear sound output apparatus 100 to operate in the two-person mode (second operation) (step S105).

Then, the right-ear sound output apparatus 100 and the left-ear sound output apparatus 100 play back music in the monaural-scheme (step S106). Specifically, the sound input-output processing unit 204 generates a monaural-scheme sound signal, and the communication unit 205 transmits the monaural-scheme sound signal to the right-ear sound output apparatus 100 and the left-ear sound output apparatus 100. Then, the sound output unit 102 of the right-ear sound output apparatus 100 and the sound output unit 102 of the left-ear sound output apparatus 100 each output sound toward the user in accordance with this monaural-scheme sound signal.

Figure 4:
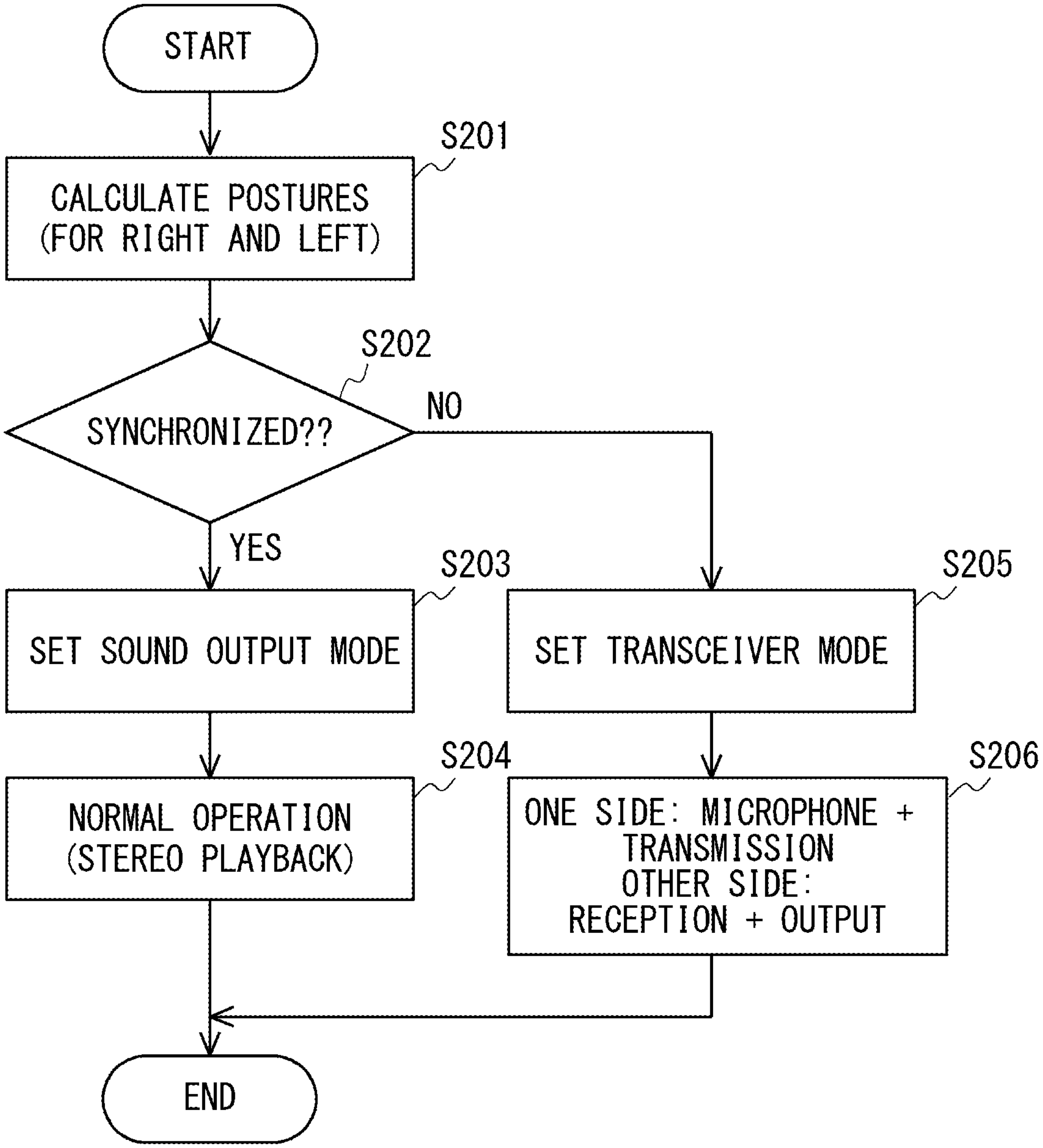
FIG. 4 is a flowchart illustrating another exemplary sound input-output control method according to the first embodiment or second embodiment of the present invention.

Subsequently, an exemplary sound input-output control method illustrated in FIG. 4 will be described below. In the sound input-output control method illustrated in FIG. 4, processing at steps S201, S202, and S204 is the same as processing at steps S101, S102, and S104, respectively, in the sound input-output control method illustrated in FIG. 3, and thus description thereof is omitted.

At step S202, when changes in the postures of the right-ear sound output apparatus 100 and the left-ear sound output apparatus 100 are synchronized (Yes at step S202), the operation control unit 203 controls the right-ear sound output apparatus 100 and the left-ear sound output apparatus 100 to operate in a sound output mode (first operation) (step S203).

At step S202, when changes in the postures of the right-ear sound output apparatus 100 and the left-ear sound output apparatus 100 are not synchronized (No at step S202), the operation control unit 203 controls the right-ear sound output apparatus 100 and the left-ear sound output apparatus 100 to operate in the transceiver mode (second operation) (step S205).

Then, a sound signal of the user, which is collected by the microphone (sound input unit) 103 of one of the sound output apparatuses 100 is transmitted to the other sound output apparatus 100, the other sound output apparatus 100 receives the sound signal, and the sound output unit 102 of the other sound output apparatus 100 outputs sound toward the user in accordance with the sound signal (step S206). For example, sound of a user on which the right-ear sound output apparatus 100 is mounted is collected by the microphone (sound input unit) 103 of the right-ear sound output apparatus 100 and transmitted to the left-ear sound output apparatus 100. Then, the sound output unit 102 of the left-ear sound output apparatus 100 outputs, in accordance with the sound signal, sound toward a user on which the left-ear sound output apparatus 100 is mounted. Similarly, sound of the user on which the left-ear sound output apparatus 100 is mounted is collected by the microphone (sound input unit) 103 of the left-ear sound output apparatus 100 and transmitted to the right-ear sound output apparatus 100. Then, the sound output unit 102 of the right-ear sound output apparatus 100 outputs, in accordance with the sound signal, sound toward the user on which the right-ear sound output apparatus 100 is mounted. Accordingly, the right-ear sound output apparatus 100 and the left-ear sound output apparatus 100 can be used as transceivers when the right-ear sound output apparatus 100 and the left-ear sound output apparatus 100 are mounted on different users.

Note that, in the above-described transceiver mode, the operation control unit 203 may control each sound output apparatus 100 to stop sound output based on a sound signal from the sound output unit 102 or to decrease the volume of sound output based on the sound signal. Alternatively, in the above-described transceiver mode, the operation control unit 203 may control one of the right-ear sound output apparatus 100 and the left-ear sound output apparatus 100 to stop collection by the sound input unit 103 at the sound output apparatus 100.

Figure 5:
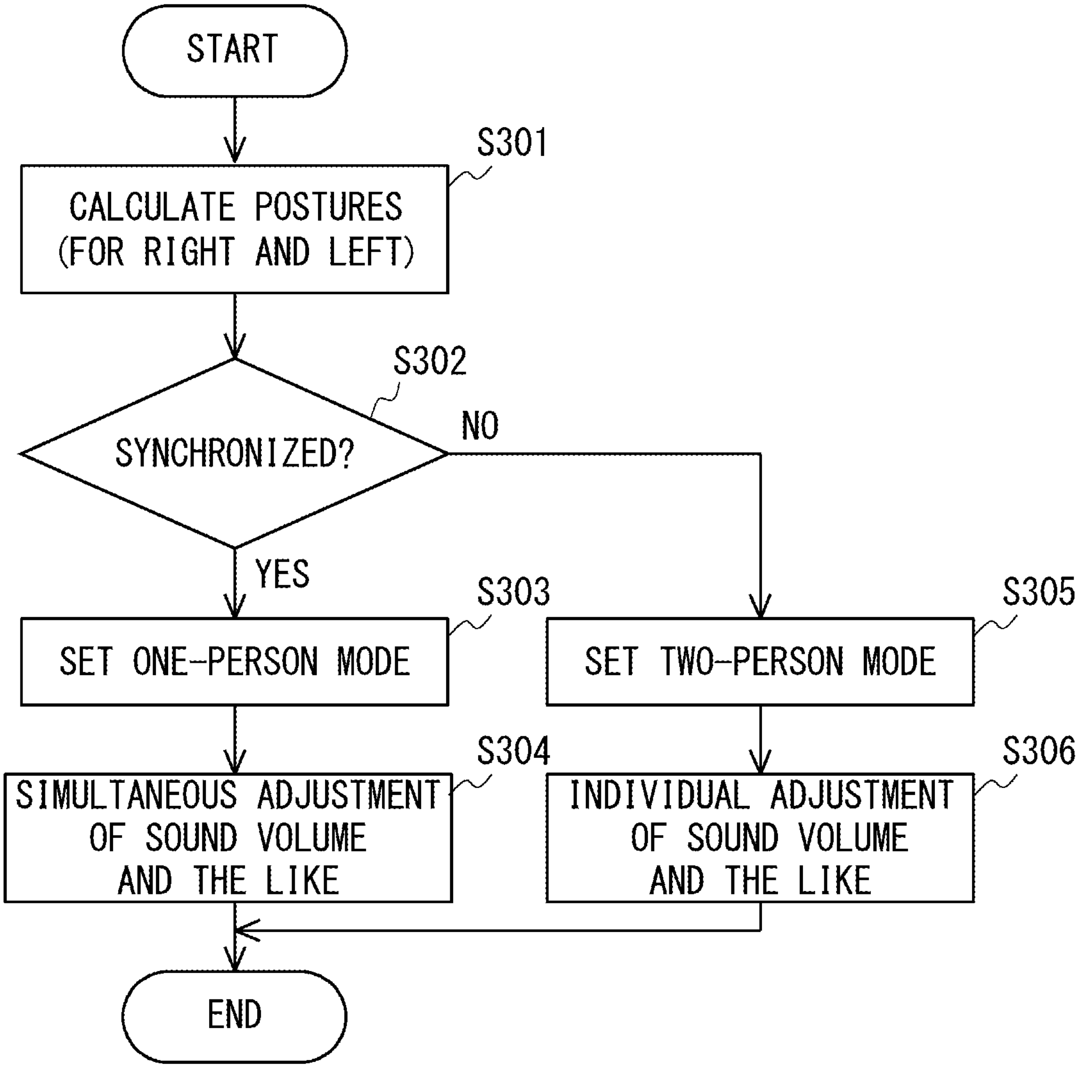
FIG. 5 is a flowchart illustrating another exemplary sound input-output control method according to the first embodiment or second embodiment of the present invention.

Subsequently, an exemplary sound input-output control method illustrated in FIG. 5 will be described below. In the sound input-output control method illustrated in FIG. 5, processing at steps S301, S302, S303, and S305 is the same as processing at steps S101, S102, S103, and S105, respectively, in the sound input-output control method illustrated in FIG. 3, and thus description thereof is omitted.

At step S303, after the right-ear and left-ear sound output apparatuses 100 are controlled to operate in the one-person mode (first operation), simultaneous adjustment (normal operation) of sound volume, sound quality, and the like is performed at the right-ear sound output apparatus 100 and the left-ear sound output apparatus 100 (step S304). Specifically, the sound input-output processing unit 204 generates a right-ear sound signal and a left-ear sound signal, and the communication unit 205 transmits the right-ear sound signal to the right-ear sound output apparatus 100 and transmits the left-ear sound signal to the left-ear sound output apparatus 100. For example, the operation control unit 203 simultaneously adjusts the volume and quality of sound output from the sound output unit 102 at each of the right-ear and left-ear sound output apparatuses 100 to the same volume and quality in effect. Then, the sound output unit 102 of the right-ear sound output apparatus 100 outputs sound toward a user in accordance with the right-ear sound signal, and the sound output unit 102 of the left-ear sound output apparatus 100 outputs sound toward the user in accordance with the left-ear sound signal.

At step S305, after the right-ear and left-ear sound output apparatuses 100 are controlled to operate in the two-person mode (second operation), adjustment of sound volume and sound quality is individually performed at the right-ear sound output apparatus 100 and the left-ear sound output apparatus 100 (step S306). Specifically, the sound input-output processing unit 204 generates a right-ear sound signal and a left-ear sound signal, and the communication unit 205 transmits the right-ear sound signal to the right-ear sound output apparatus 100 and transmits the left-ear sound signal to the left-ear sound output apparatus 100. For example, the operation control unit 203 can individually adjust the volume and quality of sound output from the sound output unit 102 at each of the right-ear and left-ear sound output apparatuses 100. For example, the sound input-output control apparatus 200 or the music playback apparatus separately displays, on an own display unit (not illustrated), a setting screen for adjusting sound volume and sound quality for the right ear and a setting screen for adjusting sound volume and sound quality for the left ear. Accordingly, a user on which the right-ear sound output apparatus 100 is mounted and a user on which the left-ear sound output apparatus 100 is mounted can operate each setting screen to apply preferable settings for each user to the sound volume and sound quality of the right-ear sound output apparatus 100 and the left-ear sound output apparatus 100. Then, the sound output unit 102 of the right-ear sound output apparatus 100 outputs sound toward the user in accordance with the right-ear sound signal, and the sound output unit 102 of the left-ear sound output apparatus 100 outputs sound toward the user in accordance with the left-ear sound signal.

Figure 6:
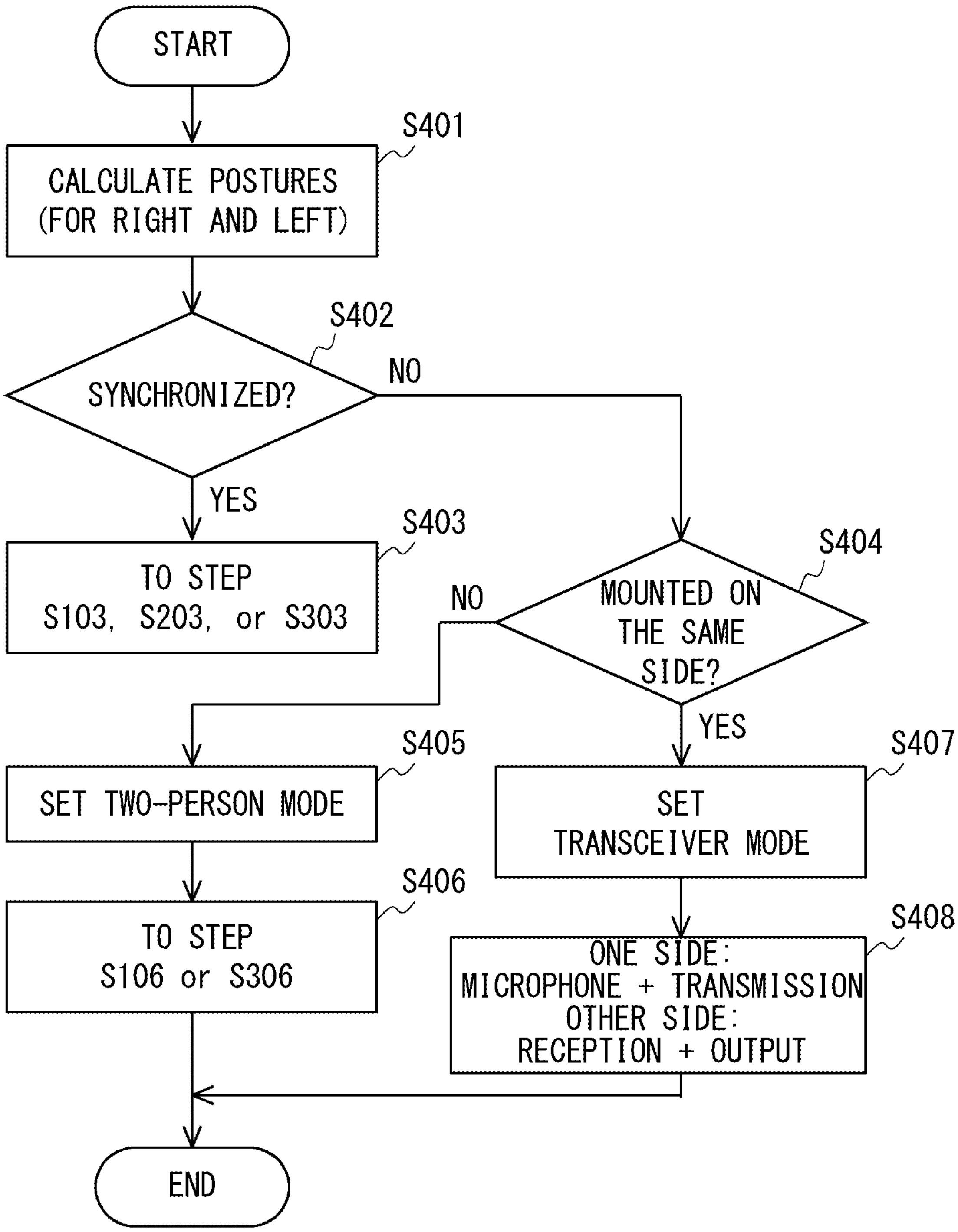
FIG. 6 is a flowchart illustrating another exemplary sound input-output control method according to the first embodiment or second embodiment of the present invention.

Subsequently, an exemplary sound input-output control method illustrated in FIG. 6 will be described below. In the sound input-output control method illustrated in FIG. 6, processing at steps S401 and S402 is the same as processing at steps S101 and S102, respectively, in the sound input-output control method illustrated in FIG. 3, and thus description thereof is omitted.

At step S402, when changes in the postures of the right-ear sound output apparatus 100 and the left-ear sound output apparatus 100 are synchronized (Yes at step S402), the process proceeds to processing at step S103, S203, or S303 (step S403).

At step S402, when changes in the postures of the right-ear sound output apparatus 100 and the left-ear sound output apparatus 100 are not synchronized (No at step S402), the operation control unit 203 determines whether the right-ear sound output apparatus 100 and the left-ear sound output apparatus 100 are mounted on the same side of different users (step S404). Specifically, the operation control unit 203 determines whether the right-ear and left-ear sound output apparatuses 100 are mounted on the same side of different users based on a mounting detection signal detected by the mounting sensor 105 and the postures of the right-ear and left-ear sound output apparatuses 100, which are calculated by the posture calculation unit 201. Note that the operation control unit 203 may perform the determination based only on the postures of the right-ear and left-ear sound output apparatuses 100, which are calculated by the posture calculation unit 201, without using the mounting detection signal detected by the mounting sensor 105.

At step S404, when the right-ear sound output apparatus 100 and the left-ear sound output apparatus 100 are mounted on different sides of different users (No at step S404), the operation control unit 203 controls the right-ear sound output apparatus 100 and the left-ear sound output apparatus 100 to operate in the two-person mode (step S405). Then, the process proceeds to processing at step S106 or S306 (step S406).

At step S404, when the right-ear sound output apparatus 100 and the left-ear sound output apparatus 100 are mounted on the same side of different users (Yes at step S404), the operation control unit 203 controls the right-ear sound output apparatus 100 and the left-ear sound output apparatus 100 to operate in the transceiver mode (step S407). Then, a sound signal of a user, which is collected by the microphone (sound input unit) 103 of one of the sound output apparatuses 100 is transmitted to the other sound output apparatus 100, the other sound output apparatus 100 receives the sound signal, and the sound output unit 102 of the other sound output apparatus 100 outputs sound toward the other user in accordance with the sound signal (step S408).

With the sound input-output control apparatus 200 according to the first embodiment described above, whether changes in respective postures of the sound output apparatuses 100, which are calculated by the posture calculation unit 201, are synchronized is determined by the synchronousness determination unit 202. When it is determined by the synchronousness determination unit 202 that changes in the respective postures of the sound output apparatuses 100 are synchronized, the operation control unit 203 controls the sound output apparatuses 100 to perform the first operation that is suitable for a case in which the sound output apparatuses 100 are mounted on the same user. When it is determined by the synchronousness determination unit 202 that changes in the respective postures of the sound output apparatuses 100 are not synchronized, the operation control unit 203 controls the sound output apparatuses 100 to perform the second operation that is suitable for a case in which the sound output apparatuses 100 are mounted on different users.

When none of changes in the postures of the sound output apparatuses 100 in the set are synchronized, the sound input-output control apparatus 200 determines that the sound output apparatuses 100 are mounted on different users. Then, the sound input-output control apparatus 200 controls the sound output apparatuses 100 to perform the above-described second operation.

Thus, a plurality of sound output apparatuses 100 each independently mounted on a user can be provided with the second operation other than the first operation that is normal operation such as outputting of stereo-scheme sound, the second operation being suitable for a case in which the sound output apparatuses 100 are mounted on different users. Accordingly, the sound output apparatuses 100 can be provided with wider usage.

This is the same for the hearable device 300 according to the second embodiment.

In the above-described embodiments, the present invention is described as a hardware configuration, but the present invention is not limited thereto. In the present invention, the procedures of processing illustrated in flowcharts in FIGS. 3 to 6 may be implemented by a central processing unit (CPU) executing a computer program.

The above-described program may be stored by using various types of non-transitory computer-readable media and supplied to a computer. The non-transitory computer-readable media include various types of tangible storage media. Examples of the non-transitory computer-readable media include a magnetic storage medium (for example, a flexible disk, a magnetic tape, and a hard disk drive), a magneto-optical storage medium (for example, a magneto optical disc), a CD-ROM (read only memory), a CD-R, a CD-R/W, a semiconductor memory (for example, a mask ROM, a programmable ROM (PROM), an erasable PROM (EPROM), a flash ROM, and a random access memory (RAM)). The program may be supplied to a computer through various types of transitory computer-readable media. Examples of the transitory computer-readable media include an electric signal, an optical signal, and an electromagnetic wave. The transitory computer-readable media can supply the program to a computer through a wired communication path such as an electrical line or an optical fiber or through a wireless communication path.

Note that the present invention is not limited to the above-described embodiments but may be modified as appropriate without departing from the scope of the invention.

A sound input-output control apparatus, a sound input-output control method, and a program that can provide wider usage to sound output apparatuses can be provided.

What is claimed is:

1. A sound input-output control apparatus configured to control a plurality of sound output apparatuses each independently mounted on a user and configured to output sound toward the user, the sound input-output control apparatus comprising:

- a posture calculation unit configured to calculate postures of respective sound output apparatuses based on a posture signal detected by the respective sound output apparatuses;
- a synchronousness determination unit configured to determine whether changes in at least two postures among the postures of the plurality of sound output apparatuses, which are calculated by the posture calculation unit, are synchronized; and
- an operation control unit configured to control operation of each of the sound output apparatuses, wherein
- at least one of the sound output apparatuses includes a sound input unit configured to collect sound of the user on which the sound output apparatus is mounted,
- when it is determined by the synchronousness determination unit that changes in at least two postures among the postures of the plurality of sound output apparatuses are not synchronized, the operation control unit determines whether each of the sound output apparatuses is mounted on left ear or right ear of a corresponding one of the users different from each other based on the posture of the respective sound output apparatus, which is calculated by the posture calculation unit,
- when at least two of the sound output apparatuses are mounted on different sides of different users, the operation control unit performs at least one of control that causes each of the sound output apparatuses to output monaural-scheme sound and control that individually adjusts volume of sound from each of the sound output apparatuses, and
- when the sound output apparatuses are mounted on a same side of different users, the operation control unit performs control that causes one of the sound output apparatuses to output the sound collected by the sound input unit of the sound output apparatus to the other sound output apparatuses.

2. The sound input-output control apparatus according to claim 1, wherein

- the posture signal is a signal related to a direction of the sound output apparatus, and
- the posture calculation unit calculates the direction of each of the sound output apparatuses.

3. A sound input-output control method in which a plurality of sound output apparatuses each independently mounted on a user and configured to output sound toward the user are controlled by a sound input-output control apparatus, the sound input-output control apparatus:

- calculating postures of respective sound output apparatuses based on a posture signal detected by the respective sound output apparatuses;
- determining whether changes in at least two postures among the calculated postures of the plurality of sound output apparatuses are synchronized; and
- controlling operation of each of the sound output apparatuses, wherein
- at least one of the sound output apparatuses includes a sound input unit configured to collect sound of the user on which the sound output apparatus is mounted,
- when it is determined by the sound input-output control apparatus that changes in at least two postures among the postures of the plurality of sound output apparatuses are not synchronized, the sound input-output control apparatus determines whether each of the sound output apparatuses is mounted on ear or right ear of a corresponding one of the users different from each other based on the posture of the respective sound output apparatus, which is calculated by the sound input-output control apparatus,
- when at least two of the sound output apparatuses are mounted on different sides of different users, the sound input-output control apparatus performs at least one of control that causes each of the sound output apparatuses to output monaural-scheme sound and control that individually adjusts volume of sound from each of the sound output apparatuses, and
- when the sound output apparatuses are mounted on a same side of different users, the sound input-output control apparatus performs control that causes one of the sound output apparatuses to output the sound collected by the sound input unit of the sound output apparatus to the other sound output apparatuses.

4. A non-transitory computer-readable medium that stores a program that causes a sound input-output control apparatus to execute processing of controlling a plurality of sound output apparatuses each independently mounted on a user and configured to output sound toward the user, the program causing the sound input-output control apparatus to execute:

processing of calculating postures of respective sound output apparatuses based on a posture signal detected by the respective sound output apparatuses;

processing of determining whether changes in at least two postures among the calculated postures of the plurality of sound output apparatuses are synchronized;

processing of controlling operation of each of the sound output apparatuses, wherein at least one of the sound output apparatuses includes a sound input unit configured to collect sound of the user on which the sound output apparatus is mounted, when it is determined by the sound input-output control apparatus that changes in at least two postures among the postures of the plurality of sound output apparatuses are not synchronized, the sound input-output control apparatus determines whether each of the sound output apparatuses is mounted on left ear or right ear of a corresponding one of the users different from each other based on the posture of the respective sound output apparatus, which is calculated by the sound input-output control apparatus, when at least two of the sound output apparatuses are mounted on different sides of different users, the sound input-output control apparatus performs at least one of control that causes each of the sound output apparatuses to output monaural-scheme sound and control that individually adjusts volume of sound from each of the sound output apparatuses, and when the sound output apparatuses are mounted on a same side of different users, the sound input-output control apparatus performs control that causes one of the sound output apparatuses to output the sound collected by the sound input unit of the sound output apparatus to the other sound output apparatuses.

* * * * *